United States Patent
Nam et al.

(10) Patent No.: US 7,907,912 B2
(45) Date of Patent: Mar. 15, 2011

(54) APPARATUS AND METHOD FOR ELIMINATING MULTI-USER INTERFERENCE

(75) Inventors: Seung-Hoon Nam, Seoul (KR);
Myeon-Kyun Cho, Seongam-si (KR);
Yung-Soo Kim, Seongnam-si (KR);
Sei-Joon Shim, Seoul (KR);
Kyeong-Yeon Kim, Seoul (KR);
Chung-Yong Lee, Seoul (KR)

(73) Assignees: Samsung Electronics Co., Ltd (KR); Industry-Academic Cooperation Foundation, Yonsei University (KR)

( * ) Notice: Subject to any disclaimer, the term of this patent is extended or adjusted under 35 U.S.C. 154(b) by 1107 days.

(21) Appl. No.: 11/601,049

(22) Filed: Nov. 17, 2006

(65) Prior Publication Data

US 2007/0155336 A1   Jul. 5, 2007

(30) Foreign Application Priority Data

Nov. 17, 2005   (KR) .................. 10-2005-0110223

(51) Int. Cl.
 H04B 17/00   (2006.01)
(52) U.S. Cl. .................................. 455/69
(58) Field of Classification Search .......... 455/69, 455/562.1, 67.13, 63.1, 114.2, 39, 63.4, 25, 455/308, 283, 447; 375/144, 267, 299, 347, 375/350, 232, 231, 233, 341, 265, 148, 260, 375/296, 346, 319, 344, 295, 229, 234, 235, 375/236, 219; 370/350, 344, 465, 328, 207, 370/342; 703/2; 714/52, 768, 571, 774, 714/784
See application file for complete search history.

(56) References Cited

U.S. PATENT DOCUMENTS

| | | | |
|---|---|---|---|
| 5,633,795 A * | 5/1997 | Popovich | 700/28 |
| 5,634,199 A | 5/1997 | Gerlach et al. | |
| 7,050,513 B1 * | 5/2006 | Yakhnich | 375/341 |
| 2005/0254347 A1 * | 11/2005 | Beaucoup | 367/905 |
| 2006/0094373 A1 * | 5/2006 | Hottinen | 455/73 |
| 2006/0265214 A1 * | 11/2006 | Witzgall et al. | 704/219 |
| 2006/0293016 A1 * | 12/2006 | Giesbrecht et al. | 455/308 |
| 2007/0014377 A1 * | 1/2007 | Pirak et al. | 375/267 |
| 2007/0058590 A1 * | 3/2007 | Wang et al. | 370/334 |
| 2007/0207730 A1 * | 9/2007 | Nguyen et al. | 455/39 |
| 2008/0007454 A1 * | 1/2008 | Minkoff | 342/379 |
| 2008/0075058 A1 * | 3/2008 | Mundarath et al. | 370/342 |
| 2008/0101499 A1 * | 5/2008 | Fung et al. | 375/295 |
| 2008/0108310 A1 * | 5/2008 | Tong et al. | 455/69 |
| 2009/0296788 A1 * | 12/2009 | Hottinen | 375/219 |
| 2010/0124930 A1 * | 5/2010 | Andrews et al. | 455/436 |
| 2010/0177851 A1 * | 7/2010 | Lin et al. | 375/319 |

FOREIGN PATENT DOCUMENTS

KR   1020050109789   11/2005

* cited by examiner

*Primary Examiner* — Melody Mehrpour
(74) *Attorney, Agent, or Firm* — The Farrell Law Firm, P.C.

(57) ABSTRACT

Provided are an apparatus and method for eliminating multi-user interference in a codebook-based beamforming system. A transmitter for providing a service to multi-users in the codebook-based beamforming system includes a beamformer for generating beamformed user signals by multiplying transmit data of users, to whom the service is to be provided, by corresponding weighting factor vectors using feedback information; a null space generator for generating a null space matrix orthogonal to weighting factor vectors of other users; and a projector for projecting the beamformed user signals on the corresponding null space matrix and transmitting the resulting signals through a plurality of antennas. Because the multi-user signals can maintain orthogonality, the performance degradation caused by the multi-user interference can be prevented.

22 Claims, 10 Drawing Sheets

APPARATUS AND METHOD FOR ELIMINATING MULTI-USER INTERFERENCE

PRIORITY

This application claims priority under 35 U.S.C. §119 to an application filed in the Korean Intellectual Property Office on Nov. 17, 2005 and allocated Serial No. 2005-110223, the contents of which are incorporated herein by reference.

BACKGROUND OF THE INVENTION

1. Field of the Invention

The present invention relates generally to a wireless communication system using multiple antennas, and in particular, to an apparatus and method for eliminating multi-user interference in a codebook-based Multiple Input Multiple Output (MIMO) system.

2. Description of the Related Art

Unlike the cable channel environment, in a radio channel environment of a wireless communication system errors inevitably occur because of various factors, such as multipath interference, shadowing, propagation attenuation, time-varying noise, and fading, resulting in data loss.

The data loss causes serious distortion of the transmit signals, thus degrading the entire performance of the wireless communication system. To reduce the data loss, various error control techniques are used to increase the reliability of the system according to channel characteristics. A basic technique is to use an error-correcting code.

Meanwhile, diversity techniques are used to reduce multipath fading in the wireless communication system. Examples of the diversity techniques include time diversity, frequency diversity, and antenna diversity.

The antenna diversity schemes using multiple antennas include a receive antenna diversity scheme using a plurality of receive antennas, a transmit antenna diversity scheme using a plurality of transmit antennas, and a MIMO scheme using a plurality of receive antennas and a plurality of transmit antennas.

In MIMO communication systems, receivers can know channel information, but transmitters cannot know channel information. Therefore, in order to improve the performance using channel information, the receivers have to feed the channel information back to the transmitters.

A MIMO system with a transmitter performing pre-coding using the channel information will be described below. Pre-coding is a beamforming process of multiplying a transmit (TX) signal by a weighting factor.

The transmitter multiplies an encoded signal (x) by a beamforming weighting factor (w) and transmits it to a channel. When the encoded signal (x) is a single stream, the beamforming weighting factor (w) consists of beamforming vectors. A signal received by the receiver is expressed as Equation (1):

$$y = \sqrt{\frac{E_S}{N_R}} Hwx + n \qquad (1)$$

where $E_S$, $N_R$, H, and n represent symbol energy, the number of RX antennas, channel, and zero mean Gaussian noise, respectively.

The transceiver finds an optimal beamforming vector (w) prior to the transmission or reception operations and then transmits or receives signals using the optimal beamforming vector (w). The number ($N_T$) of TX antennas, the number (N) of streams, and the number (N) of beamforming vectors determine a beamformer (or a codebook) (W). The beamformer (W) can be designed using "Grassmannian Line Packing". The beamformer (W) is expressed as Equation (2):

$$W=[w_1 w_2 \ldots w_N], w_i; i=1, \ldots, N \qquad (2)$$

where $w_i$ represents an $i^{th}$ beamforming vector ($N_T \times 1$), and the beamformer W is constructed with N beamforming vectors.

Generally, the beamformer (or the codebook) randomly generates the beamforming vectors and calculates a minimum distance between the vectors. Then, the beamformer W is designed using N vectors that make the minimum distance have a maximum value.

Table 1 shows a codebook having four TX antennas, a single stream, and eight beamforming vectors according to the Institute of Electrical and Electronics Engineers (IEEE) 802.16e system. Such a codebook-based system forms antenna beams using the predefined beamforming vectors.

TABLE 1

| | Vector Index | | | | | | | |
|---|---|---|---|---|---|---|---|---|
| | 1 | 2 | 3 | 4 | 5 | 6 | 7 | 8 |
| Antenna 1 | 1 | 0.3780 | 0.3780 | 0.3780 | 0.3780 | 0.3780 | 0.3780 | 0.3780 |
| Antenna 2 | 0 | −0.2698 −j0.5668 | −0.7103 +j0.1326 | 0.2830 −j0.0940 | −0.0841 +j0.6478 | 0.5247 +j0.3532 | 0.2058 −j0.1369 | 0.0618 −j0.3332 |
| Antenna 3 | 0 | 0.5957 +j0.1578 | −0.2350 −j0.1467 | 0.0702 −j0.8261 | 0.0184 +j0.0490 | 0.4115 +j0.1825 | −0.5211 j0.0833 | −0.3456 +j0.5029 |
| Antenna 4 | 0 | 0.1587 −j0.2411 | 0.1371 +j0.4893 | −0.2801 +j0.0491 | −0.3272 −j0.5662 | 0.2639 +j0.4299 | 0.6136 −j0.3755 | −0.5704 +j0.2113 |

To find the optimal beamforming vector, the receiver (or terminal) carries out an operation expressed by Equation (3):

$$\arg\min_{xbit} \frac{E_s}{N_0} tr\left\{\left(I_{N_t} + \frac{E_s}{N_r N_0} w_l^H H^H H w_l\right)^{-1}\right\} \qquad (3)$$

where $w_l$ is a beamforming vector selected from the previously known codebook, and I, $N_t$, $N_r$, H, $E_s$, and $N_0$ represent an identity matrix, the number of TX antennas, the number of RX antennas, a channel between the transmitter and the receiver, a signal, and a noise, respectively.

The receiver transmits to the transmitter over a feedback channel the beamforming vector ($w_l$) selected by solving Equation (3).

Referring to FIG. 1, the transmitter includes an encoder/modulator 101, a weighting factor multiplier 103, a plurality of antennas 107-1 to 107-N$_T$, and a weighting factor generator 105. The receiver includes a plurality of antennas 109-1 to 109-N$_R$, a MIMO decoder 111, a demodulator/decoder 113, and a codebook selector 115.

In the transmitter, the encoder/modulator 101 encodes outgoing data in accordance with a given coding scheme and generates complex symbols by modulating the encoded data in accordance with a given modulation scheme. The weighting factor generator 105 generates a beamforming vector corresponding to a codebook index fed back from the receiver. That is, the weighting factor generator 105 manages a codebook database and generates the beamforming vector corresponding to the codebook index. The weighting factor multiplier 103 multiplies the complex symbols by the beamforming vector and transmits the resulting signal through the antennas 107-1 to 107-N$_T$.

In the receiver, the MIMO decoder 111 receives signals through the antennas 109-1 to 109-N$_R$. At this point, the signals contain noise components. The MIMO decoder 111 decodes the input vectors using a predetermined MIMO detection method and estimates the vectors transmitted from the transmitter. The demodulator/decoder 113 demodulates and decodes the symbols estimated by the MIMO decoder into original data.

The codebook selector 115 constructs the channel coefficient matrix (H) by estimating the channel using a predetermined signal (e.g., pilot signal) output from the MIMO decoder 111, and searches the optimal beamforming vector using the channel coefficient matrix (H). The codebook information is stored in the memory. Using the beamforming vector and the channel coefficient matrix read from the memory, the codebook selector 115 performs the operation of Equation (3) to select the optimal beamforming vector. Also, the codebook selector 115 feeds back the index of the selected beamforming vector (or the codebook index) to the transmitter over the feedback channel. Because the transmitter also has the codebook information, only the index of the beamforming vector is fed back. Thus, size of the feedback information can be reduced because only the index of the beamforming vector is transmitted. As an example, when the codebook is designed using eight beamforming vectors, the index can be expressed in 3 bits.

As described above, the existing codebook-based (or quantization-based) system is configured considering a single user. Therefore, when the system of FIG. 1 is expanded to provide the service to multi-users, the multi-user interference occurs together with the quantization error, thus degrading the system's performance.

It can be seen from FIG. 2 that the system performance (bit error rate (BER) in the same signal to noise ratio (SNR)) is greatly increased as the number of the users increases. The performance of the conventional quantization-based system depends on the performance of the maximum ratio transmission (MRT). In the MRT system, however, there are no approaches that can reduce the influence of the multi-user interference in the multi-user environment. Thus, if the MRT system provides the service to multi-users, the system performance is greatly reduced as illustrated in FIG. 2.

SUMMARY OF THE INVENTION

An object of the present invention is to substantially solve at least the above problems and/or disadvantages and to provide at least the advantages below. Accordingly, an object of the present invention is to provide an apparatus and method for providing a service to multi-users in a codebook-based beamforming system, in which the performance degradation caused by multi-user interference can be prevented.

Another object of the present invention is to provide an apparatus and method for providing a service to multi-users in a codebook-based beamforming system, in which beamformed user signals are projected into null spaces formed for each user.

A further object of the present invention is to provide an apparatus and method for providing a service to multi-users in a codebook-based beamforming system, in which user combination is selected such that beamforming vectors are orthogonal and the service is provided to the users according to the selected user combination.

According to one aspect of the present invention, a transmitter for providing a service to multi-users in a codebook-based beamforming system includes a beamformer for generating user signals beamformed by multiplying transmit data of users by corresponding weighting factor vectors using feedback information; a null space generator for generating a null space matrix orthogonal to weighting factor vectors of other users; and a projector for projecting the beamformed user signals on the corresponding null space matrix and transmitting the resulting signals through a plurality of antennas.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The following description is about a method for reducing the performance degradation caused by the multi-user interference when a codebook-based beamforming system provides a service to multi-users.

Figure 1:
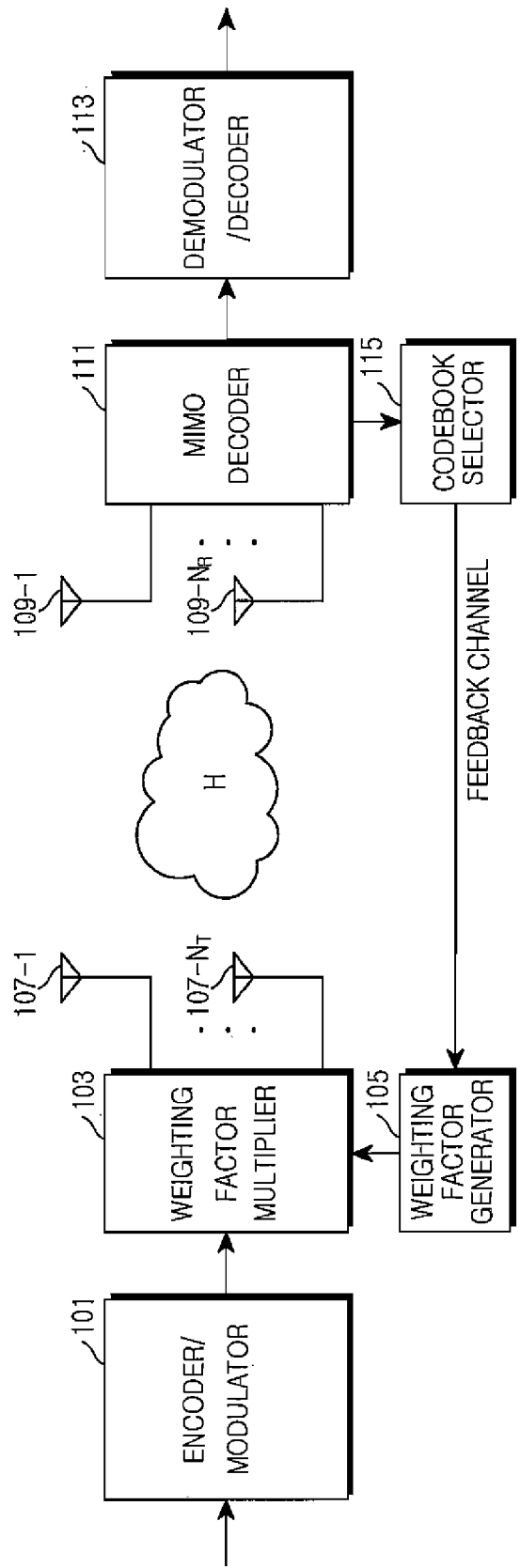
FIG. 1 is a block diagram of a prior codebook-based MIMO system.
Figure 2:
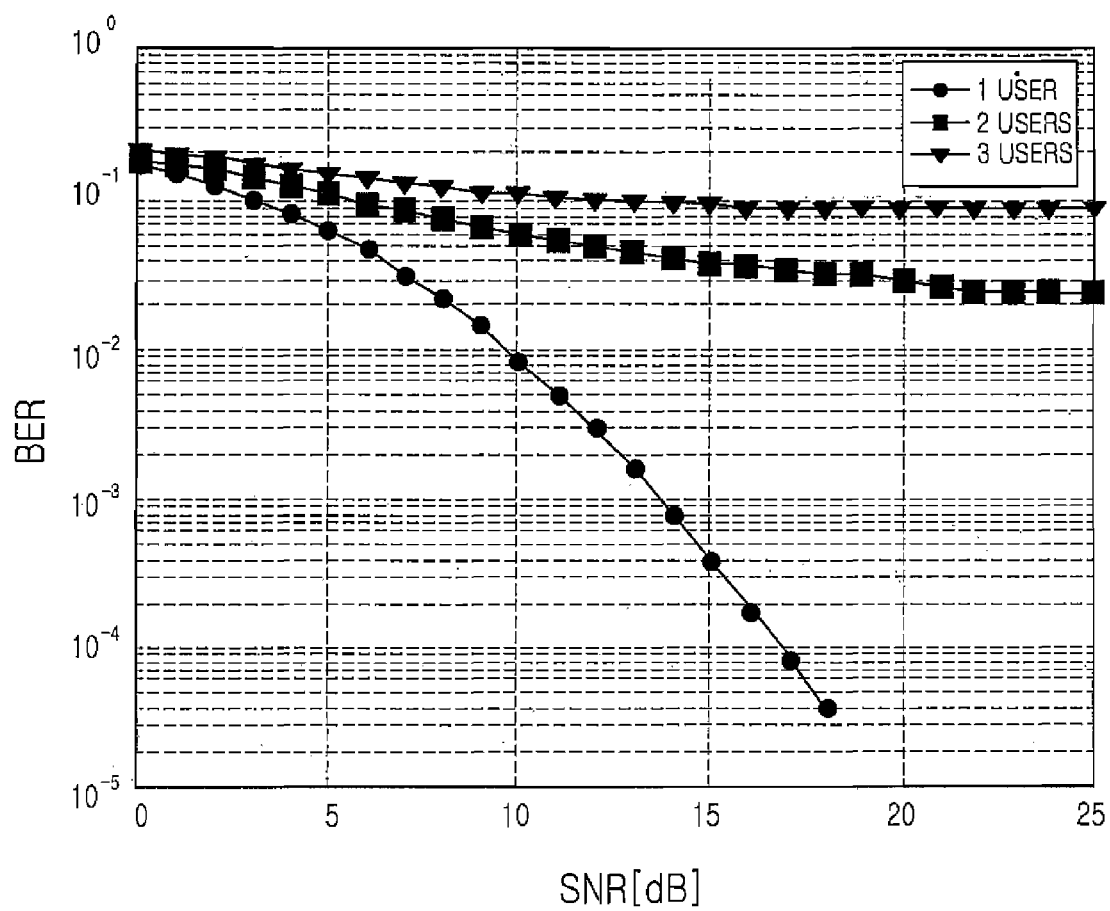
FIG. 2 is a graph of the performance variation with respect to the number of users in a prior codebook-based beamforming system.
Figure 3:
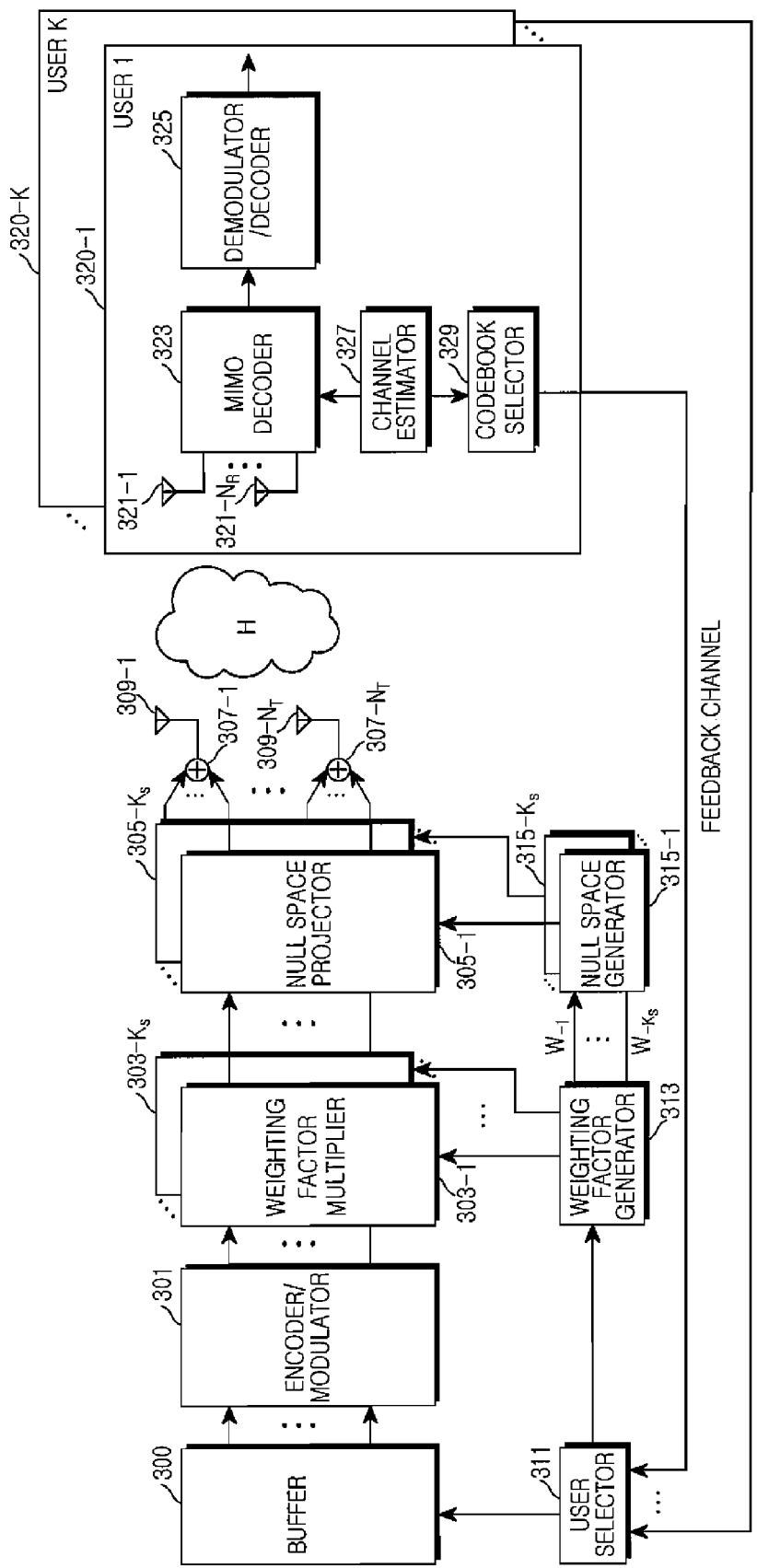
FIG. 3 is a block diagram of a null space codebook-based beamforming system according to the present invention.

Referring to FIG. 3, a transmitter includes a buffer 300, an encoder/modulator 301, a plurality of weighting factor multipliers 303-1 to 303-$K_S$, a plurality of null space projectors 305-1 to 305-$K_S$, a plurality of adders 307-1 to 307-$N_T$, a plurality of antennas 309-1 to 309-$N_T$, a user selector 311, a weighting factor generator 313, and a plurality of null space generators 315-1 to 315-$K_S$. In addition, each of receivers 320-1 to 320-K includes a plurality of antennas 321-1 to 321-$N_R$, a MIMO decoder 323, a demodulator/decoder 325, a channel estimator 327, and a codebook selector 329. Because the receivers 320-1 to 320-K receiving the service from the transmitter have the same structure, the receiver 320-1 will be taken as an example.

In the transmitter, the user selector 311 receives codebook indexes and user selection information fed back from the receivers 320-1 to 320-K, and selects the users to which the service is to be provided by using the user selection information. The user selector 311 provides the buffer 300 with the user selection signal. In addition, the user selector 311 provides the weighting factor generator 313 with the codebook indexes fed back from the selected users. The fed-back user selection information may include a distance between a weighting factor vector actually calculated by the receiver and a codebook vector, a channel status, a product of the distance and the channel status, and so on. That is, using the fed-back information, the user selector 311 selects a predetermined number of users whose channel status is good and/or in which distance between the real channel and the codebook is short.

The buffer 300 buffers a plurality of user packets to be transmitted, and selects the packets of the corresponding users according to the user selection signal output from the user selector 311. The encoder/modulator 301 encodes the user data received from the buffer 300 and generates complex symbols by modulating the encoded data.

The weighting factor generator 313 manages the codebook database and generates weighting factor vectors (beamforming vectors) with respect to the codebook indexes received from the user selector 311. The weighting factor generator 313 provides the beamforming vectors to the corresponding weighting factor multipliers 303-1 to 303-$K_S$. In addition, the weighting factor generator 313 generates a matrix consisting of undesired beamforming vectors with respect to the selected users, and provides the matrix to the corresponding null space generator 305-1 to 305-$K_S$.

An interference matrix consisting of undesired beamforming vectors with respect to a $k^{th}$ user can be expressed as Equation (4):

$$W_{-k} = [w_1 \ldots w_{k-1} w_{k+1} \ldots w_{Ks}] \quad (4)$$

where $w_k$ is the beamforming vector of the $k^{th}$ user.

The weighting factor multipliers 303-1 to 303-$K_S$ generate beamformed user signals by multiplying the $k^{th}$ user's TX vector from the encoder/modulator 301 by the $k^{th}$ user's beamforming vector from the weighting factor generator 313.

The null space generators 315-1 to 315-$K_S$ generate a projection matrix from the interference matrix of the $k^{th}$ user output from the weighting factor generator 313 by using Gram-Schmidt orthogonalization. Using the projection matrix, the null space generators 315-1 to 315-$K_S$ generate null space matrix (or orthogonal space matrix) for nulling the signals of the users except for the $k^{th}$ user, and provides the null space matrix to the corresponding null space projectors 305-1 to 305-$K_S$.

The projection matrix $P_k$ of the $k^{th}$ user can be calculated using Equation (5):

$$P_k W_{-k} (W_{-k}^H W_{-k})^{-1} W_{-k}^H \quad (5)$$

In addition, the null space of the $k^{th}$ user can be calculated using Equation (6):

$$\text{null space} = C_k (I - P_k) \quad (6)$$

where $C_k$ is a scaling constant.

The null space projectors 305-1 to 305-$K_S$ multiply the null space matrixes from the corresponding null space generators by the beamformed user signals from the corresponding weighting factor multipliers. In other words, projecting the beamformed user signals on the null space of each user eliminates the interference between the users.

The adders 307-1 to 307-$N_T$ add the corresponding antenna signals output from the null space projectors 305-1 to 305-$N_T$, and outputs the added antenna signals to the corresponding antennas. For example, the adder 307-1 adds first antenna signals output from the null space projectors 305-1 to 305-$N_T$, and outputs the added antenna signals to the first antenna 309-1. Although not shown, when an Orthogonal Frequency Division Multiplexing (OFDM) scheme is used, the output signal of the adder 307-1 is OFDM-modulated, and the OFDM-modulated signal is RF-processed such that it can be transmitted over the real radio communication channel. Then, the RF-processed signal is transmitted through the first antenna over the radio communication channel.

In the receiver, the antennas 321-1 to 321-$N_R$ receive the signals transmitted from the antennas 309-1 to 309-$N_T$ of the transmitter. Although not shown, when the OFDM scheme is used, RF signals received through the antennas 321-1 to 321-$N_R$ are converted into baseband sample data. The sample data are OFDM-modulated and then decoded by the MIMO decoder 323.

The MIMO decoder 323 decodes the RX vectors in accordance with a given MIMO detection method, and estimates the TX vectors transmitted from the transmitter. Examples of the MIMO detection method includes a Maximum Likelihood (ML) scheme, a Modified ML (MML) scheme a Zero-Forcing (ZF) scheme, a Minimum Mean Square Error (MMSE) scheme, a Successive Interference Cancellation (SIC) scheme, and a Vertical Bell Labs Layered Space Time (V-BLAST) scheme. The demodulator/decoder 325 demodulates and decodes the estimated symbols from the MIMO decoder 323 into original data.

The channel estimator 327 constructs the channel coefficient matrix (H) by estimating the channel using a predetermined signal (e.g., pilot signal) output from the MIMO decoder 323. The channel coefficient matrix can be used to estimate the TX vector in the MIMO decoder 323, and can be used to search the codebook index in the codebook selector 329.

The codebook selector 329 calculates the beamforming weighting factor vector that can maximize channel gain by using the channel coefficient matrix received from the channel estimator 327, compares the weighting factor vector with the vectors of the codebook, and transmits the index (codebook index) of the vector that is closest to the weighting factor vector through the feedback channel to the transmitter. At this point, the codebook selector 329 feeds back the user selection information as well as the codebook index to the transmitter. As described above, the user selection information may include the distance between the actually calculated weighting factor vector and the codebook vector, the channel status, the product of the distance and the channel status, and so on.

Figure 4:
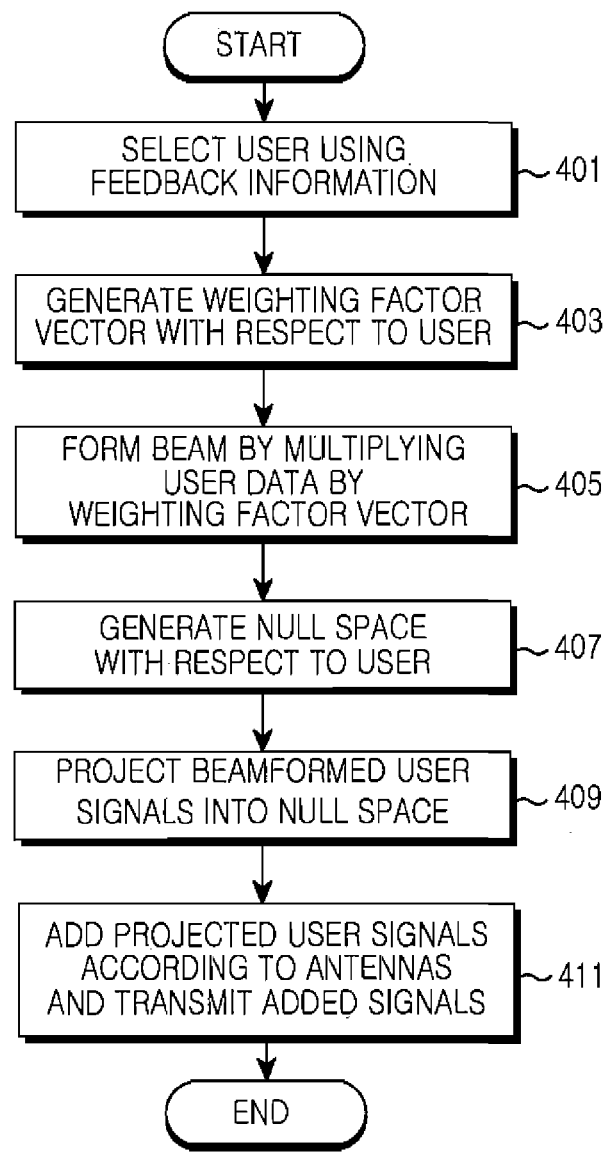
FIG. 4 is a flowchart illustrating a process of providing the service to multi-users in the null space codebook-based beamforming system.

Referring to FIG. 4, the transmitter selects the receivers (users) to which the service is to be provided by using the user selection information fed back from the receivers in step 401. The user selection information may include a distance between a weighting factor vector actually calculated by the receiver and a codebook vector, a channel status, a product of the distance and the channel status, and so on. That is, using the fed-back information, the transmitter selects a predetermined number of users whose channel status is good and/or in which distance between the real channel and the codebook is short.

In step 403, the transmitter generates the weighting factor vectors (beamforming vectors) with respect to the selected users by using the fed-back codebook indexes. In step 405, the transmitter generates the beamformed user signals by multiplying the user data by the weighting factor vector.

In step 407, the transmitter generates the null space with respect to the selected users. Specifically, the transmitter constructs the interference matrix with respect to the users, generates the projection matrix from the interference matrix by using Gram-Schmidt orthogonalization, and generates the null space with respect to the corresponding user by subtracting the projection matrix from the identity matrix.

In step 409, the transmitter orthogonalizes the user signals by projecting the beamformed user signals into the corresponding null space. In step 411, the transmitter adds the projected user signals according to the antennas. Then, the transmitter processes the added user signals in accordance with a regulated transmission specification, and transmits the processed user signals through the corresponding antenna.

Figure 5:
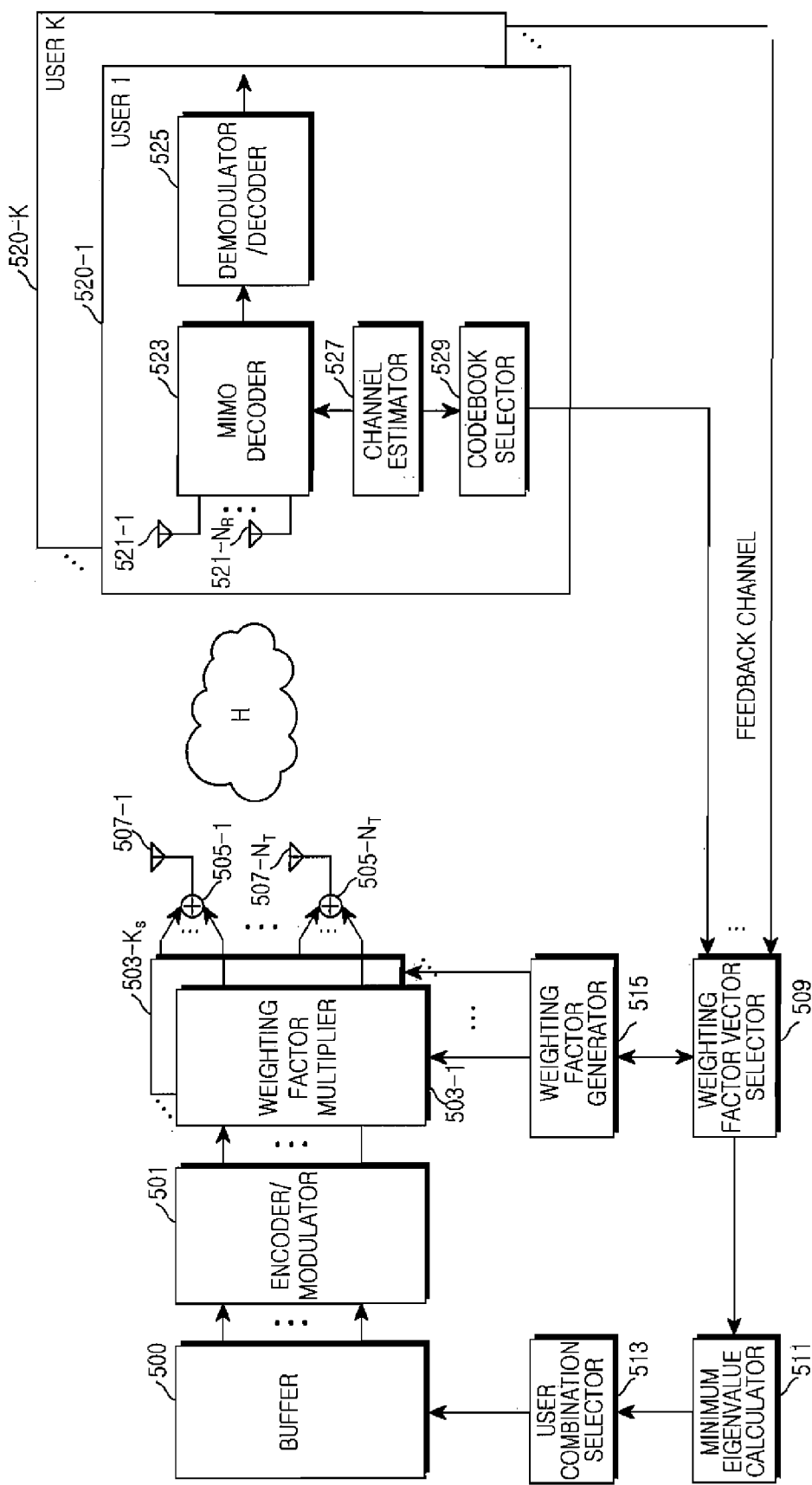
FIG. 5 is a block diagram of an orthogonal codebook-based beamforming system according to the present invention.

Referring to FIG. 5, a transmitter includes a buffer 500, an encoder/modulator 501, a plurality of weighting factor multipliers 503-1 to 503-$K_S$, a plurality of adders 505-1 to 505-$N_T$, a plurality of antennas 507-1 to 507-$N_T$, a weighting factor vector selector 509, a minimum eigenvalue calculator 511, a user combination selector 513, and a weighting factor generator 515. In addition, each of receivers 520-1 to 520-K includes a plurality of antennas 521-1 to 521-$N_R$, a MIMO decoder 523, a demodulator/decoder 525, a channel estimator 527, and a codebook selector 529. Because the receivers 520-1 to 520-K receiving the service from the transmitter have the same structure, the receiver 520-1 will be taken as an example.

In the transmitter, the weighting factor vector selector 509 receives weighting factor vectors (beamforming vectors) from the weighting factor generator 515 with respect to codebook indexes fed back from the receivers 520-1 to 520-K. The weighting factor vector selector 509 constructs a weighting factor matrix ($A^{(j)}$) by selecting $K_S$ weighting factor vectors among K weighting factor vectors output from the weighting factor generator 515. At this point, the number of cases that select the $K_S$ weighting factor vectors among the K weighting factor vectors is $_KC_{Ks}$.

The minimum eigenvalue calculator 511 calculates the minimum eigenvalue of $A^{(j)H}A^{(j)}$ with respect to the KCKS weighting factor matrixes output from the weighting factor vector selector 509. The user combination selector 513 selects the smallest value among the minimum eigenvalues output from the minimum eigenvalue calculator 511, selects the user combination corresponding to the selected minimum eigenvalue, and provides the buffer 500 with a user selection signal corresponding to the selected user combination.

The operation of selecting the smallest value among the minimum eigenvalues can be expressed as Equation (7):

$$A^{(k)} = \operatorname*{arg\,min}_{A^{(k)},\ j=1,\ldots,\ _kC_{Ks}} \left|1 - \lambda_{min}\left(\{A^{(j)}\}^H\{A^{(j)}\}\right)\right| \quad (7)$$

where $\lambda_{min}(\cdot)$ means the minimum eigenvalue of the matrix.

If the $K_S$ weighting factor vectors are orthogonal to one another, $A^{(j)H}A^{(j)}$ approaches the identity matrix I. Thus, the user combination selector 513 selects the user combination whose eigenvalue is closest to 1 with respect to all $_KC_{Ks}$ user combinations.

The buffer 500 buffers a plurality of user packets to be transmitted, and selects the packets of the corresponding users according to the user selection signal output from the user combination selector 511. The encoder/modulator 501 encodes the user data received from the buffer 500 in accordance with a given coding scheme and generates complex symbols by modulating the encoded data in accordance with a given modulation scheme.

The weighting factor generator 515 manages the codebook database and generates weighting factor vectors (beamforming vectors) corresponding to the user selection signal output from the user combination selector 513. Then, the weighting factor generator 515 provides the beamforming vectors to the corresponding weighting factor multipliers 503-1 to 503-$K_S$.

The weighting factor multipliers 503-1 to 503-$K_S$ generate beamformed user signals by multiplying the $k^{th}$ user's TX vector from the encoder/modulator 501 by the $k^{th}$ user's beamforming vector from the weighting factor generator 515.

The adders 505-1 to 505-$N_T$ add the corresponding antenna signals output from the weighting factor multipliers 503-1 to 503-$N_T$, and outputs the added antenna signals to the corresponding antennas. For example, the adder 505-1 adds first antenna signals output from the weighting factor multipliers 503-1 to 503-$N_T$, and outputs the added antenna signals to the first antenna 507-1. Although not shown, when an OFDM scheme is used, the output signal of the adder 505-1 is OFDM-modulated, and the OFDM-modulated signal is RF-processed such that it can be transmitted over the real radio communication channel. Then, the RF-processed signal is transmitted through the first antenna over the radio communication channel.

In the receiver, the antennas 521-1 to 521-$N_R$ receive the signals transmitted from the antennas 507-1 to 507-$N_T$ of the transmitter. Although not shown, when the OFDM scheme is used, RF signals received through the antennas 521-1 to 521-$N_R$ are converted into baseband sample data. The sample data are OFDM-modulated and then serve as input to the MIMO decoder 523.

The MIMO decoder 523 decodes the RX vectors in accordance with a given MIMO detection method, and estimates the TX vectors transmitted from the transmitter. Examples of the MIMO detection method includes a Maximum Likelihood (ML) scheme, a Modified ML (MML) scheme a Zero-Forcing (ZF) scheme, a Minimum Mean Square Error (MMSE) scheme, a Successive Interference Cancellation (SIC) scheme, and a Vertical Bell Labs Layered Space Time (V-BLAST) scheme. The demodulator/decoder 525 demodulates and decodes the estimated symbols from the MIMO decoder 523 into original data.

The channel estimator 527 constructs the channel coefficient matrix (H) by estimating the channel using a predetermined signal (e.g., pilot signal) output from the MIMO decoder 523. The channel coefficient matrix can be used to estimate the TX vector in the MIMO decoder 523, and can be used to search the codebook index in the codebook selector 529.

The codebook selector 529 calculates the beamforming weighting factor vector that can maximize the channel gain by using the channel coefficient matrix received from the channel estimator 527, compares the weighting factor vector with the vectors of the codebook, and transmits the index (codebook index) of the vector that is closest to the weighting factor vector through the feedback channel to the transmitter.

Figure 6:
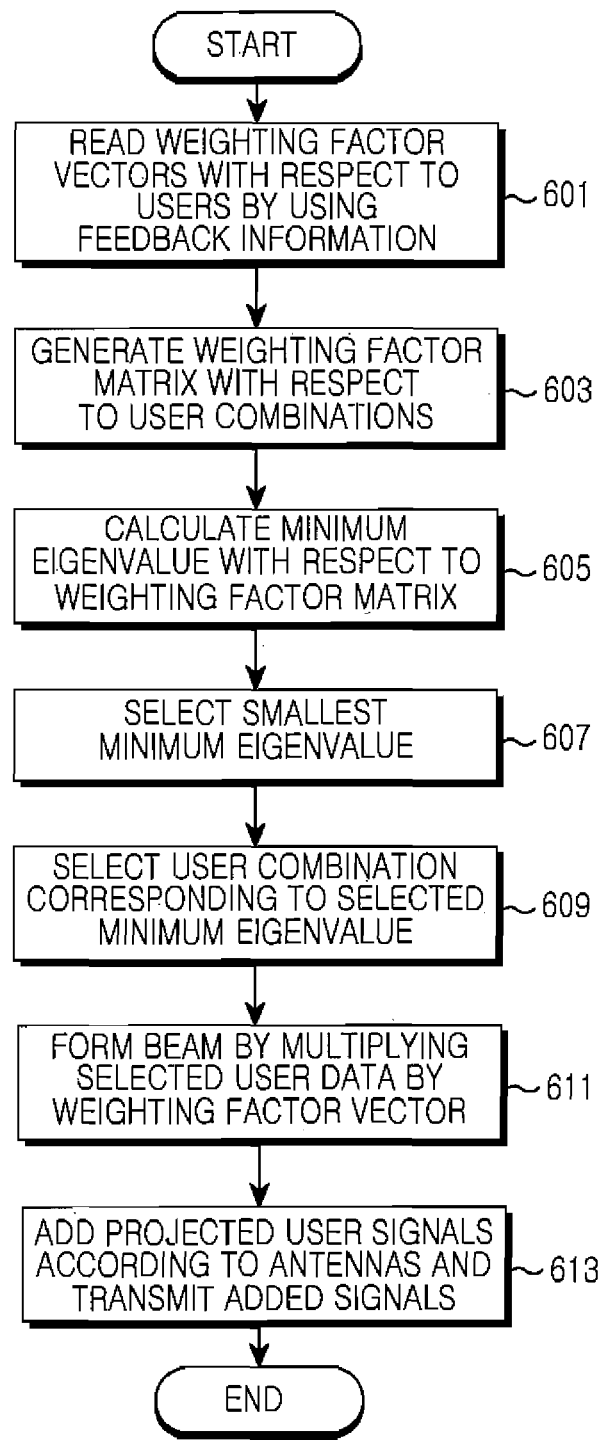
FIG. 6 is a flowchart illustrating a process of providing the service to multi-users in the orthogonal codebook-based beamforming system.

Referring to FIG. 6, the transmitter reads the weighting factor vector from the codebook database using the codebook indexes fed back from the K receivers in step 601. In step 603, the transmitter generates the weighting factor matrix $A^{(j)}$ consisting of the corresponding weighting factor vectors with respect to the user combinations in all the cases of selecting the $K_S$ users among the K users.

In step 605, the transmitter calculates $A^{(j)H}A^{(j)}$ with respect to the weighting factor matrixes, and calculates the minimum eigenvalue of $A^{(j)H}A^{(j)}$. In step 607, the transmitter selects the smallest value of the calculated minimum eigenvalues. In step 609, the transmitter selects the user combination corresponding to the selected minimum eigenvalue.

In step 611, the transmitter generates the weighting factor vector (beamforming vector) with respect to the selected users by using the fed-back codebook indexes, and generates the beamformed user signals by multiplying the user data by the beamforming vector.

In step 613, the transmitter adds the user signals according to the antennas. Then, the transmitter processes the added user signals in accordance with a regulated transmission specification, and transmits the processed user signals through the corresponding antenna.

Hereinafter, the simulation results according to the present invention will be described.

Figure 7A:
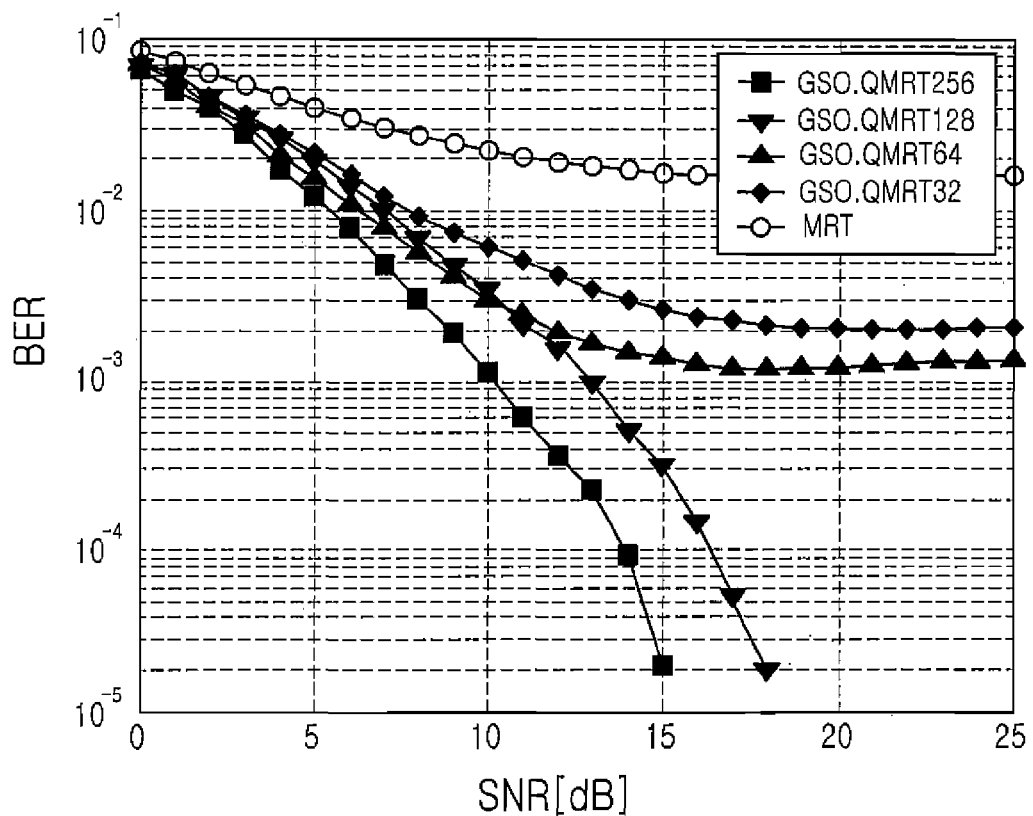
FIG. 7A is a graph illustrating the performance of the null space codebook-based beamforming system (GSO-QMRT)
Figure 7B:
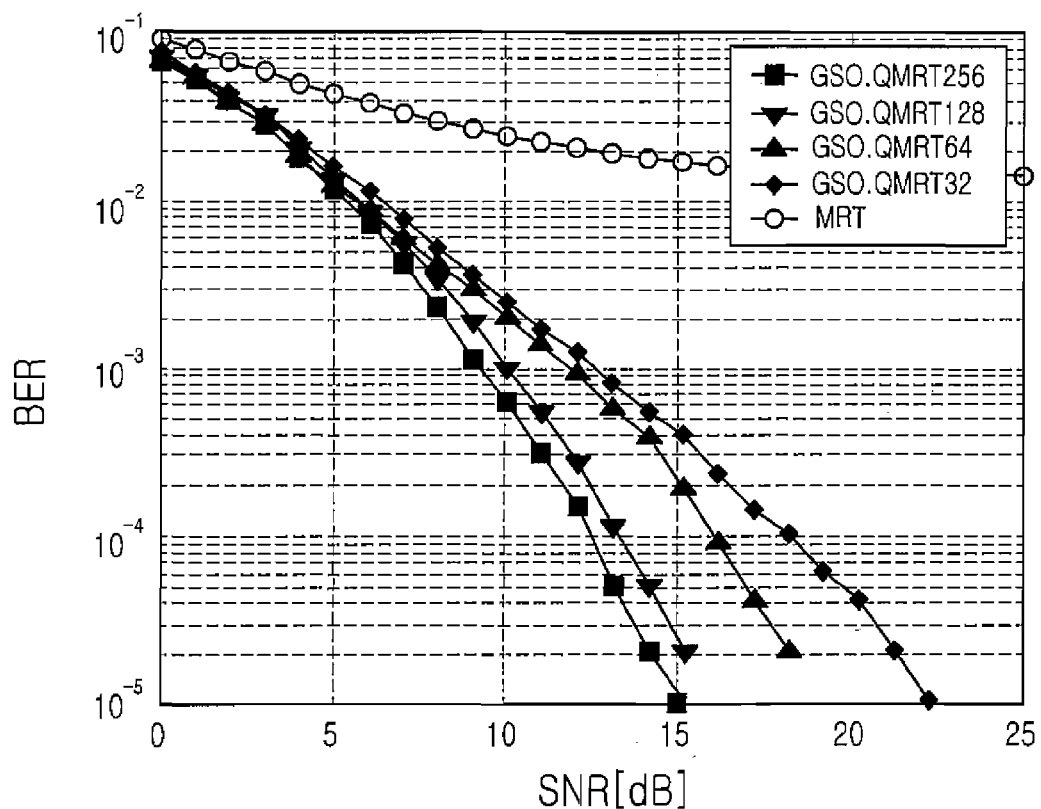
FIG. 7B is another illustration of the performance of the null space codebook-based beamforming system (GSO-QMRT)

Referring to FIG. 7A, compared with the MRT system that cannot eliminate the multi-user interference, the Gram-Schmidt Orthogonalization-Quantized MRT (GSO-QMRT) system according to the present invention shows improvement in performance gain. As the quantization level increases, that is, as the codebook size increases, the system performance improved. In addition, it can be seen that the system of FIG. 7B, which selects two users among hundred users, has better performance than the system of FIG. 7A, which selects two users among ten users. The reason for this is that as the number of users increases, the probability that the perfect orthogonal weighting factor vector set will be found increases.

Figure 8A:
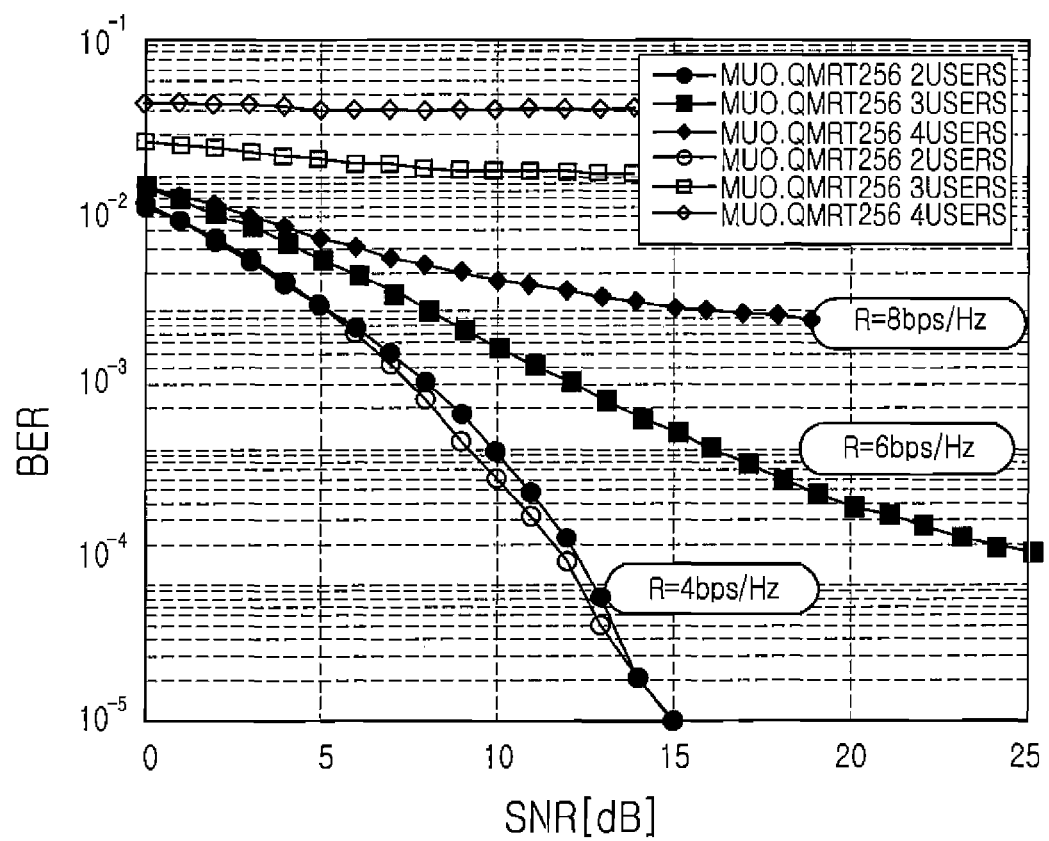
FIG. 8A is a graph illustrating the performance of the codebook-based beamforming system (MUO-QMRT)

Referring to FIG. 8A, compared with the GSO-QMRT system, the performance of the Multi-User Orthogonalization-Quantized MRT (MUO-QMART) system is not greatly degraded when the number of the users increases. However, when the number of the selected users is two, the performances of the two systems are similar. In terms of complexity, the GSO-QMRT system is more efficient than the MUO-QMRT system, because the MUO-QMRT system executes the pre-coding operation.

Figure 8B:
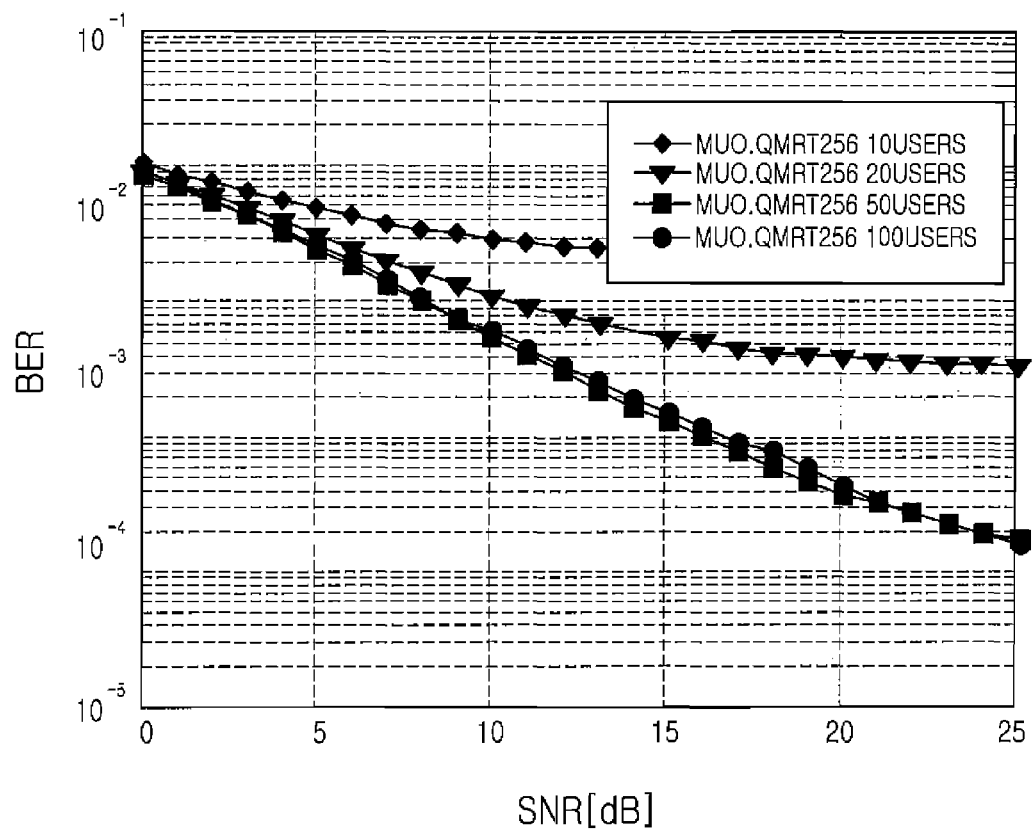
FIG. 8B is another illustration of the performance of the codebook-based beamforming system (MUO-QMRT).

Referring to FIG. 8B, as the number of the users increases, the performance is not improved. However, the performance is saturated by the quantization error of the codebook.

As described above, because the multi-user signals can maintain the orthogonality in the codebook-based beamforming system, the performance degradation caused by the multi-user interference can be prevented.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. A transmitter for providing a service to multi-users, comprising:
a beamformer for generating beamformed user signals by multiplying transmit data of users, to whom the service is to be provided, by corresponding weighting factor vectors using feedback information;
a null space generator for generating a null space matrix orthogonal to weighting factor vectors of other users; and
a projector for projecting the beamformed user signals on the corresponding null space matrix.

2. The transmitter of claim 1, wherein the beamformer comprises:
a user selector for selecting a predetermined number of users to whom the service is to be provided by using the feedback information;
a weighting factor generator for generating weighting factor vectors with respect to the selected users by using the feedback information; and
a weighting factor multiplier for generating the beamformed user signals by multiplying the transmit data of the selected users by the corresponding weighting factor vector output from the weighting factor generator.

3. The transmitter of claim 1, wherein the projector comprises:
a null space projector for multiplying the beamformed user signals output from the beamformer by the corresponding null space matrix output from the null space generator; and
an adder for adding the user signals output from the null space projector according to antennas, and providing the added antenna signals to corresponding antennas.

4. The transmitter of claim 1, wherein the feedback information comprises codebook index and user selection information.

5. The transmitter of claim 4, wherein the user selection information contain one of a distance between a weighting factor vector actually calculated by a receiver and a codebook vector, a channel status, and a product of the distance and the channel status.

6. The transmitter of claim 2, wherein the user selector uses the feedback information to select a predetermined user whose channel status is good and in which distance between a real channel and a codebook is short.

7. The transmitter of claim 1, wherein the null space generator generates the null space matrix with respect to the users by using Gram-Schmidt orthogonalization.

8. The transmitter of claim 1, wherein the null space generator generates a projection matrix from an interference matrix consisting of weighting factor vectors of other users with respect to a $k^{th}$ user, and generates a null space matrix with respect to the $k^{th}$ user by subtracting the projection matrix from an identity matrix.

9. A transmitter for providing a service to multi-users, comprising:
a user combination selector for selecting a predetermined number of weighting factor vectors orthogonal to one another among weighting factor vectors according to codebook indexes fed back from a receiver, and determining a user combination based on the selected weighting factor vectors; and
a beamformer for beamforming transmit data of users based on user combination into weighting factor vectors based on the corresponding fed-back codebook indexes.

10. The transmitter of claim 9, wherein the user combination selector comprises:
a weighting factor vector selector for selecting a predetermined number of weighting factor vectors among weighting factor vectors according to the fed-back codebook indexes, and constructing a weighting factor matrix $A^{(j)}$ (where j=1, 2, . . . , number of user combinations) according to the user combination;

a minimum eigenvalue calculator for calculating the minimum eigenvalues $A^{(j)H}A^{(j)}$ with respect to the weighting factor matrixes output from the weighting factor vector selector and a user combination selector for selecting the smallest value of the minimum eigenvalues and for selecting a user combination corresponding to the selected minimum eigenvalue.

11. The transmitter of claim 9, wherein the beamformer comprises:

a weighting factor multiplier for generating beamformed user signals by multiplying the transmit data of the users by the weighting factor vector according to the corresponding codebook index; and an adder for adding the beamformed user signals according to antennas, and providing the added antenna signals to the corresponding antennas.

12. A method for transmitting a service to multi-users in a codebook-based beamforming system, comprising the steps of:

generating beamformed user signals by multiplying transmit data of users to which the service is to be provided using feedback information by corresponding weighting factor vectors;

generating a null space matrix orthogonal to weighting factor vectors of other users; and projecting the beamformed user signals on the corresponding null space matrix.

13. The method of claim 12, wherein the step of generating the beamformed user signals comprises:

selecting a predetermined number of users to whom the service is to be provided using the feedback information;

generating weighting factor vectors with respect to the selected users by using the feedback information; and generating the beamformed user signals by multiplying the transmit data of the selected users by the corresponding weighting factor vector.

14. The method of claim 12, wherein the transmitting step comprises:

projecting the beamformed user signals on the corresponding null space matrix; and adding the user signals projected on the null space matrix according to the antennas, and transmitting the added antenna signals through the corresponding antennas.

15. The method of claim 12, wherein the feedback information comprises codebook index and user selection information.

16. The method of claim 15, wherein the user selection information contain one of a distance between a weighting factor vector actually calculated by a receiver and a codebook vector, a channel status, and a product of the distance and the channel status.

17. The method of claim 13, wherein the step of selecting the users comprises:

using the feedback information to select a predetermined users whose channel status is good and in which distance between a real channel and a codebook is short.

18. The method of claim 12, wherein the null space matrix with respect to the users is generated using Gram-Schmidt orthogonalization.

19. The method of claim 12, wherein the step of generating the null space matrix comprises:

generating a projection matrix from an interference matrix consisting of weighting factor vectors of other users with respect to a $k^{th}$ user; and generating a null space matrix with respect to the $k^{th}$ user by subtracting the projection matrix from an identity matrix.

20. A method for transmitting a service to multi-users in a codebook-based beamforming system, comprising the steps of:

selecting a predetermined number of weighting factor vectors orthogonal to one another among weighting factor vectors according to codebook indexes fed back from a receiver, and determining a user combination based on the selected weighting factor vectors; and beamforming transmit data of users based on user combination into weighting factor vectors based on the corresponding fed-back codebook indexes.

21. The method of claim 20, wherein the step of determining the user combination comprises:

selecting a predetermined number of weighting factor vectors among weighting factor vectors according to the fed-back codebook indexes, and constructing a weighting factor matrix $A^{(j)}$ (where j=1, 2, . . . , number of user combinations) according to the user combination;

calculating $A^{(j)H}A^{(j)}$ with respect to the weighting factor matrixes, and calculating minimum eigenvalues of $A^{(j)}{}_H A^{(j)}$; and selecting the smallest value of the minimum eigenvalues and selecting a user combination corresponding to the selected minimum eigenvalue.

22. The method of claim 20, wherein the transmitting step comprises:

generating beamformed user signals by multiplying the transmit data of the users by the weighting factor vector according to the corresponding codebook index; and adding the beamformed user signals according to the antennas, and providing the added antenna signals to the corresponding antennas.

* * * * *